(12) United States Patent
Morel

(10) Patent No.: US 9,871,790 B2
(45) Date of Patent: Jan. 16, 2018

(54) IDENTIFICATION METHOD OF AN ENTITY

(71) Applicant: MORPHO, Issy-les-Moulineaux (FR)

(72) Inventor: Constance Morel, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 177 days.

(21) Appl. No.: 14/990,633

(22) Filed: Jan. 7, 2016

(65) Prior Publication Data

US 2016/0205095 A1 Jul. 14, 2016

(30) Foreign Application Priority Data

Jan. 8, 2015 (FR) ..................................... 15 50156

(51) Int. Cl.
*H04L 29/06* (2006.01)
*G06F 7/04* (2006.01)
(Continued)

(52) U.S. Cl.
CPC ........ *H04L 63/0861* (2013.01); *H04L 9/3231* (2013.01); *G06K 9/00885* (2013.01); *H04L 2209/46* (2013.01)

(58) Field of Classification Search
CPC ........... G08K 9/00617; G06K 9/00885; G06K 9/00892
See application file for complete search history.

(56) References Cited

U.S. PATENT DOCUMENTS

2007/0239604 A1* 10/2007 O'Connell ............. G06Q 30/06
705/50
2008/0298642 A1* 12/2008 Meenen ................... G06K 9/00
382/115

FOREIGN PATENT DOCUMENTS

FR 2984559 6/2013

OTHER PUBLICATIONS

French Search Report and Written Opinion, dated Nov. 20, 2015, French Application No. 1550156.
(Continued)

*Primary Examiner* — Fatoumata Traore
(74) *Attorney, Agent, or Firm* — Blakely Sokoloff Taylor & Zafman LLP

(57) ABSTRACT

The present invention relates to identification method of an entity executed by an identification system from indexed distance data ($d_1, \ldots, d_n$) corresponding to reference entities and comprising:
  a determination phase of a set (I) of indices of minima ($index_1, \ldots, index_k$) from said indexed distance binary data of length q' comprising an execution step comprising,
for each set of $j^{th}$ bits of indexed distance data contained in a list of data to be processed, j being an integer varying from q'–1 to 0, starting by the set of most significant bits of the data to be processed and finishing by the set of least significant bits of the data to be processed,
  the search of indices of minima comprising, if a number of indices of a first group of indices of indexed distance data (p) is greater than a remaining number of indexed data to be set aside (r), addition of said indices of a second group to the set of indices of minima;
  an identification phase of the entity to be identified from the reference entities corresponding to the stored reference biometric data determined associated with the indices of minimal distance data ($index_1, \ldots, index_k$), the operations on binary integers for conducting at least said execution step, being translated in the form of at least one Boolean circuit used to execute at least said execution step securely between the control server and the management server by means of a secure multi party computation protocol enabling secure evaluation of said Boolean circuit.

10 Claims, 2 Drawing Sheets

(51) Int. Cl.
    *H04L 9/32*      (2006.01)
    *G06K 9/00*      (2006.01)

(56)        References Cited

OTHER PUBLICATIONS

Chen, Hong, et al., "Dental Biometrics: Alignment and Matching of Dental Radiographs", *IEEE Transactions on Pattern Analysis and Machine Intelligence*, vol. 27, No. 8, (Aug. 1, 2005), 1319-1326.
Erkin, Zekeriya, et al., "Privacy-Preserving Face Recognition", (Aug. 5, 2009), 235-253.
Goldreich, Oded, et al., "How to Play Any Mental Game, or a Completeness Theorem for Protocols with Honest Majority", *Proceedings of the Nineteenth Annual ACM Conference on Theory of Computing*, (Jan. 1, 1987), 218-229.
Mitchell, Cayman, et al., "Radix Selection Algorithm for the $k$th Order Statistic", Retrieved from the Internet: http://csis.pace.edu/ctappert/srd2012/a4.pdf, (May 4, 2012).

\* cited by examiner

IDENTIFICATION METHOD OF AN ENTITY

GENERAL TECHNICAL FIELD

The present invention relates to the field of identification of an entity, individuals or objects. More precisely, it relates to a secure identification method of an entity.

PRIOR ART

For establishing identification of an entity such as an individual, a biometric datum of this individual can be used to identify this entity relative to a biometric database, or else at least to determine a restricted number of candidate entities for such identification from those registered in such a database. For this, a biometric datum of the entity to be identified is generally acquired and compared to reference biometric data acquired previously and stored in a database. Such a comparison determines if this database contains a reference biometric datum identical to, close to a tolerable error, that of the individual to be identified or several data close to that of the individual to be identified.

Such identification can have a high level of security due to the uniqueness of the biometric data of an individual such as his DNA fingerprint or the design of his iris. In return, such data can be bulky, making their comparison one by one with the set of reference data of a database capable of containing millions very costly.

To reduce the cost of biometric identification, existing methods, such as that disclosed in WO2013/092916 "Biometric identification using filters and by secure multipart calculation", Morpho, A. Patey, propose first of all performing filtering of the acquired biometric and reference data to obtain simplified data, less heavy, whereof the comparison is less costly. Such comparison rapidly determines the reference data of the database closest to the acquired biometric datum. These reference data are good candidates in the search for a reference biometric datum corresponding to that of the individual. The acquired biometric datum, complete, can then for example be compared only to these closest reference data to determine if the database contains a reference biometric datum corresponding to the individual and if the latter is identified successfully.

Such an identification process can be executed by an exchange of information between a control server performing acquisition of the biometric datum of the individual to be identified and a management server having access to the content of the reference biometric database.

To avoid compromising the security of the identification mechanism it is necessary to maintain confidentiality of the reference data stored in such a database. A hacker for example must find out no information by means of the control server on these data by trying to identify himself, even by undertaking multiple attempts. Similarly, to ensure anonymity and the private life of individuals trying to identify themselves, the management server must find out no information on them during an identification, not even the biometric datum acquired by the control server.

For this, protocols of secure calculations can be employed. Such protocols, such as the GMW protocol (O. Goldreich, S. Micali, and A. Wigderson, "How to play any mental game or a completeness theorem for protocols with honest majority", Symposium on Theory of Computing (STOC), ACM, 1987) pages 218-229. ACM, 1987) or the Yao protocol (Andrew Chi-Chih Yao, "How to generate and exchange secrets", Foundations of Computer Science, 1986, 27th Annual Symposium, pages 162-167, IEEE, 1986) calculate the result of application of a function to data shared between two entities without any of these identities obtaining information on the data possessed by the other entity or on the results of the intermediate calculations necessary for calculation of the final result. Such protocols can be applied to the search from the simplified reference data of those showing a minimal distance from the simplified biometric datum acquired from the individual to be authenticated so that neither the control server nor the management server learns information on the data provided by the other server and neither of the two servers has knowledge of the scheduling of the minimal distances corresponding to the reference data provided as a result.

More precisely, such protocols can be applied to a sorting algorithm of the distances between the simplified biometric datum of the individual and the biometric simplified reference data. These distances can be sorted securely by ascending or descending order, and the desired number of minimal distances can be determined once the set of distances corresponding to the set of reference biometric data is sorted.

Alternatively, such protocols can be applied to a search algorithm of minimal value. The minimal distance from the set of distances corresponding to the set of reference biometric data can be determined securely. Once the determined minimal distance is subtracted from the set of evaluated distances, such a search can be conducted again from this new set of distances to determine a second minimal distance. Such a method can be repeated as many times as necessary to obtain the desired number of minimal distances.

All the same, such secure evaluation methods of a certain number of minimal values from a large set of distances can prove very costly.

In fact, such protocols are based on the secure evaluation of a Boolean circuit representing the calculation operations to be performed. The cost of such an evaluation grows with the number of gates of this circuit not corresponding to an operation exclusive or XOR (Kolesnikov, V., Schneider, T., Improved garbled circuit: Free XOR gates and applications, International Colloquium on Automata, Languages and Programming (ICALP'08). LNCS, vol. 5126, pp. 486-498. Springer (2008)), and with the depth of the circuit.

Existing methods for determination of several minimal distances secured by protocols based on Boolean circuits substantially boost the number of non-XOR gates of the Boolean circuit employed and the depth of this circuit by requiring sorting the set of distances from which the minimal distances are searched, or else by requiring all these distances to be rad as many times as the number of minimal distances to be determined.

The application of such methods for secure identification of an individual from a database containing a large number of reference biometric data has a very high cost.

Therefore there is a need for a secure identification method of an entity to identify an individual by means of a secured protocol based on Boolean circuits for a lower calculation cost, by minimising the number of non-XOR gates and the depth of the Boolean circuit employed to determine several minimal distances between a biometric datum of the individual and reference biometric data.

PRESENTATION OF THE INVENTION

The present invention proposes according to a first aspect an identification method of an entity, executed by an identification system comprising a management server likely to be connected to a storage device storing indexed reference biometric data corresponding to reference entities and a control server likely to acquire a biometric datum of the entity to be identified, said management server and said control server being likely to be connected together, from indexed distance data, said indexed distance data being distances calculated from the stored indexed reference biometric data and the acquired biometric datum of the entity to be identified, said indexed distance data being shared between said control server and said management server such that none of said distance data is known to the management server or the control server, said indexed distance data being binary integers of length q', said identification method being characterized in that it comprises:

a determination phase of a set of indices of minima, said set of indices of minima comprising at most a predetermined number of indices of minimal distance data from said indexed distance data, said determination phase comprising:

previously, an initialisation step during which:
  a list of data to be processed is determined, said list of data to be processed comprising said indexed distance data,
  a remaining number of indexed distance data to be set aside is determined, said remaining number of indexed distance data to be set aside being equal to the difference between the number of indexed distance data and the predetermined number of indices, an execution step comprising,
  for each set of $j^{th}$ bits, so-called current bits, of indexed distance data comprised in said list of data to be processed, so-called data to be processed, j being an integer varying from q'−1 to 0,
  performing of the following steps,
  starting by the set of most significant bits of the data to be processed and finishing by the set of least significant bits of the data to be processed:
  comparison of a number of indices of a first group of indices of indexed distance data to the remaining number of indexed data to be set aside,
    said first group of indices comprising the indices of the indexed distance data from said list of data to be processed for which said current bit is equal to 1,
  search of indices of minima comprising:
    if the number of indices of the first group is less than the remaining number of indexed data to be set aside:
      removal from said list of data to be processed of data whereof the indices belong to the first group, and
      determination of a new remaining number of indexed data to be set aside by subtracting from the remaining number of indexed data to be set aside the number of indices of the first group;
    else:
      removal from said list of data to be processed of the indexed distance data whereof the indices form part of a second group of indices of indexed distance data,
      said second group comprising the indices of the indexed distance data from said list of data to be processed for which said current bit is equal to 0, and
      addition of said indices of the second group to the set of indices of minima;

an identification phase of the entity to be identified from the reference entities corresponding to the stored reference biometric data associated with the indices of minimal distance data determined during the determination phase, the operations on binary integers for implementing at least said execution step of said identification method, being translated in the form of at least one Boolean circuit, said Boolean circuit being then used to execute at least said execution step of said method, this execution being carried out securely between the control server and the management server by means of a secure multi party computation (SMC) protocol for secure evaluation of said Boolean circuit, said identification method being further characterized in that:

belonging of indexed distance data to said list of data to be processed is stored in the form of a marker of data to be processed, said marker of data to be processed being a binary integer of length equal to the number of indexed distance data and the value of the $i^{th}$ bit of said marker indicating belonging or not of the $i^{th}$ indexed distance datum to said list of data to be processed, belonging of indices of indexed distance data to the set of indices of minima is stored in the form of a minima marker, said minima marker being a binary integer of length equal to the number of indexed distance data n, the value of the $i^{th}$ bit of said marker indicating belonging or not of the index i to the set of indices of minima, the number of indexed distance data $d_1, \ldots, d_n$ being equal to n:

the initialisation step further comprises the initialisation of all the bits of the marker of data to be processed b and of the minima marker c at the value 1, the comparison step comprises steps of:
  determination of the number p of indices of the first group by counting the number of elements equal to the value 1 from the set $(d_1^j$ AND $b_1, \ldots, d_n^j$ AND $b_n)$, the notation $d_i^j$ representing the value of the $j^{th}$ bit of the indexed index distance datum i,
  if the number p of indices of the first group is less than the remaining number of indexed data to be set aside r, setting of a comparison bit e at the value 1,
  else, setting of said comparison bit e at the value 0, the search step is performed by executing:
  updating of the remaining number of indexed data to be set aside r, the remaining number of indexed data to be set aside r being replaced by the value [((r−p) XOR r) AND e]XOR r,
  updating of each bit of the minima marker c, each $i^{th}$ bit $c_i$ of the minima marker c being replaced by the value $[(d_i^j$ OR e) OR $(b_i$ XOR 1)]AND $c_i$,
  updating of each bit of the marker of data to be processed b, each $i^{th}$ bit $b_i$ of the marker of data to be processed b being replaced by the value (e XOR $d_i^j$) AND $b_i$.

Such a method minimises the cost of secure identification of an entity by reading each bit of each indexed distance datum one time only. The size of the logical circuit to be evaluated securely is greatly reduced.

The use of such markers determines at any time for each indexed distance datum if it must continue to be processed or not during later search steps and if it has been determined as a minimal distance datum without having to reread any indexed distance datum. Each bit of each indexed distance datum is therefore always read a single time only during determination of the k minimal distance data.

The identification phase can comprise determination of at least one reference biometric datum similar to the acquired biometric datum of the entity to be identified, from the stored reference biometric data associated with the indices of minimal distance data determined during the determination phase.

The entity to be identified can be identified only from its acquired biometric datum by comparing the latter precisely to a limited number only of reference biometric data.

On completion of the determination phase, if the number of indices of the set of indices of minima determined is less than the predetermined number of indices of minimal distance data, the identification method according to the first aspect can comprise a completion step during which indices of indexed distance data belonging to the list of data to be processed are added to the set of indices of minima such that said set comprises a number of indices equal to the predetermined number of indices of minimal distance data.

This produces the desired number of minimal distance data, even when several indexed distance data are equal and only part of these equal distances must be considered as minimal distance data.

Said completion step can successively comprise for each index i of the indexed distance data:

if the remaining number of indexed data to be set aside r is greater than zero, the determination of a new value of the remaining number of indexed data to be set aside by subtracting the $i^{th}$ bit $b_i$ of the marker of data to be processed b from the remaining number of indexed data to be set aside, and resetting to zero of the value of the $i^{th}$ bit $b_i$ of the marker of data to be processed b, updating of the $i^{th}$ bit $c_i$ of the minima marker c by the value $c_i = c_i \text{ AND } (b_i \text{ XOR } 1)$.

The integration of these operations within the logic circuit to be evaluated produces the desired number of minimal distance data securely without having to disclose any datum, especially the minima marker c, before completion of determination of the set of minimal distance data to be determined.

Said reference biometric data can be binary integers and the method according to the first aspect can comprise previously:

an acquisition phase by the control server of the biometric datum of the entity to be identified, an obtaining phase of an identity datum of the entity to be identified and reference identity data from respectively the acquired biometric datum and the indexed reference biometric data, such that said identity datum of the entity to be identified and the reference identity data are binary integers of lesser size than that of said biometric data, the indices of the reference identity data being associated with the indices of the reference biometric data, a calculation phase of the distance data comprising for each reference identity datum the secure calculation of a distance between the identity datum of the entity to be identified and said reference identity datum.

The identification phase of the method according to the first aspect can further comprise steps of:

calculation, for each reference biometric datum whereof the index is associated with an index of the determined set of minima, of a degree of similarity between the acquired biometric datum of the entity to be identified and said reference biometric datum;

determination of at least one reference biometric datum whereof the degree of similarity exceeds a predetermined threshold;

identification of the entity to be identified from the determined reference biometric data.

The use of simplified distance data of less length than the reference biometric data more rapidly performs determination of the minimal distance data and therefore accelerates identification of the entity to be identified.

In a variant embodiment:

calculation of a degree of similarity between the acquired biometric datum of the entity to be identified and said reference biometric datum comprises calculation of a distance between the acquired biometric datum of the entity to be identified and said reference biometric datum;

said at least one determined reference biometric datum is said at least one reference biometric datum for which the distance calculated is less than a predetermined threshold.

The secure multi party computation protocol (SMC) can be the Yao protocol or the GMW protocol.

According to a second aspect, the invention relates to a computer program product comprising code instructions for execution of an identification method according to the first aspect when this programme is executed by a processor.

According to a third aspect, the invention relates to an identification system of an entity comprising a management server likely to be connected to a storage device storing indexed reference biometric data corresponding to reference entities and a control server likely to acquire a biometric datum of the entity to be identified, said management server and said control server being likely to be connected together and sharing indexed distance data such that none of said distance data is known to the management server or the control server, said indexed distance data being distances calculated from the stored indexed reference biometric data and the acquired biometric datum of the entity to be identified, characterized in that said control server and said management server comprise a processor configured to execute the phases and steps of an identification method according to the first aspect.

Such computer program product and identification system have the same advantages as those mentioned for the method according to the first aspect.

PRESENTATION OF FIGURES

Other characteristics and advantages of the present invention will emerge from the following description of a preferred embodiment. This description will be given in reference to the appended drawings, in which.

DETAILED DESCRIPTION

Figure 1:
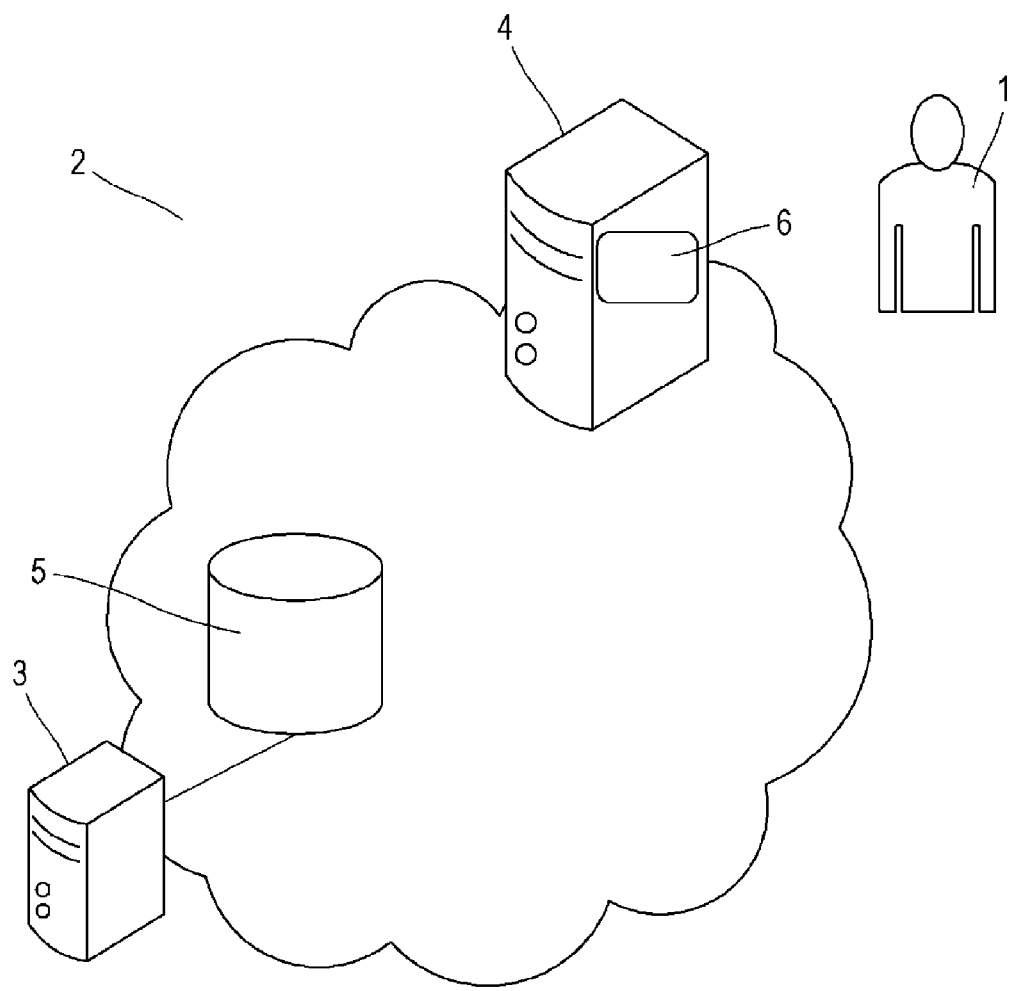
FIG. 1 illustrates an identification system according to an embodiment of the invention.

The present invention relates to an embodiment of an identification method of an entity 1 by an identification system 2 comprising a management server 3 and a control server 4 likely to be connected together, as shown in FIG. 1. Such entity can be an individual or else an object having biometric data such as a biometric passport. The management server can be connected to a storage device 5 storing n indexed reference biometric data $(Y_1, \ldots, Y_n)$ able to be binary integers of length Q, corresponding to n reference entities recorded on the management server.

Such identification can be made from a number n of indexed distance data $(d_1, \ldots, d_n)$ shared between the control server and the management server. These distance data can be binary data of length q' corresponding to distances, for example Hamming distances, calculated from an biometric datum of the entity to be identified acquired by the control server and indexed reference biometric data stored in the storage device 5.

The control and management servers can each comprise a random access memory (RAM) and internal storage means such as a non-volatile rewritable memory (flash memory or EEPROM memory) and processing means comprising a processor. The servers can further comprise interface means enabling them to dialogue with each other, of wire type such as an Ethernet link, or wireless such as a Wifi or Bluetooth connection. The management server can also be connected by means of a USB, Ethernet, Firewire, eSata connection etc. to the storage device 5 such as an external hard drive or a networked hard drive ("NAS").

By way of example, such biometric data can be fingerprints, DNA, voice or else iris or venous network images.

The control server can comprise a capture device 6 of such biometric data, such as a fingerprint reader, a microphone, or an iris-imaging device. This capture device can be employed to acquire the acquired biometric datum for the entity 1.

To identify the entity to be identified in a reasonable period the method proposes determining from these indexed distance data a predetermined number k of indices of the minimal distance data from the indexed distance data. Once these k minimal distance data are determined, identification of the entity can for example be carried out by comparing with the acquired biometric datum for the entity 1 only those k reference biometric data corresponding to these minimal distance data.

To perform such determination of k minimal distance data securely, a multi party secured protocol such as the GMW protocol or the Yao protocol using Boolean circuits can be employed. The calculation steps necessary for this determination must be put into the form of a Boolean circuit.

The method proposes limiting the size of this Boolean circuit, that is, the number of non-XOR gates of this circuit and its depth to limit the cost of such secure determination of k minimal distance data from the indexed distance data (Kolesnikov, V., Schneider, T., Improved garbled circuit: Free XOR gates and applications, International Colloquium on Automata, Languages and Programming (ICALP'08). LNCS, vol. 5126, pp. 486-498. Springer (2008)).

For this, the method proposes first of all simultaneously processing sets of indexed distance data by simultaneously analysing the value of the $j^{th}$ bit, so-called current bit, of these indexed distance data, starting with the most significant bit of these distance data. Analysis of the most significant bit of the set of indexed distance data $(d_1, \ldots, d_n)$ in fact separates these distance data into two groups: a group A whereof the most significant bit is equal to 1 and a group B whereof the most significant bit is equal to 0. Irrespective of the value of the others bits of these data, the distances of the group A are necessarily all greater than those of group B.

The search for a number k of minimal distance data from a set of n indexed distance data is equivalent to the search in the set of n indexed distance data of a number (n−k) of non-minimal distance data. If the number of data of the group A is less than the number (n−k) of non-minimal distance data to be searched, the data of the group A can be set aside for the rest of the search: the k minimal distance data to be determined are found necessarily from the data of group B. The $n_A$ data of the group A are all non-minimal distance data. Inversely, if the number of data of the group A is greater than the number (n−k) of non-minimal distance data to be searched, all these non-minimal distance data necessarily form part of the group A. As a consequence all the $n_B$ data of the group B form part of the k minimal distance data to be determined. These data of the group B can therefore be stored and set aside for the rest of the search.

Once the most significant bit of all the indexed distance data is analysed, such analysis can be repeated by analysing the next current bit of the indexed distance data remaining to be analysed, that is, not having been set aside from the rest of the search during the preceding step, to search for $(k-n_B)$ minimal distance data or $(n-k-n_A)$ non-minimal distance data according to the result of the analysis above.

Such analysis can then be repeated until the current bit analysed has attained the least significant bit of the distance data.

Each analysis of a set of distance data remaining to be processed for a position of the current bit separates these distance data into two groups and sets aside from the rest of the search the data of one of these two groups, either as minimal distance data or as non-minimal distance data.

Determination of k minimal distance data requires only a single pass of the indexed distance data: each bit of an indexed distance datum is read a single time only.

Also, to be able to put the operations to be performed in the form of a Boolean circuit and limit the size and complexity of this Boolean circuit, the method proposes employing a marker of data to be processed b and a minima marker c to store belonging of an indexed distance datum respectively to a set of distance data to be processed for the search of minimal distance data, that is, not set aside from the search process, and to the set of desired minimal distance data. Such markers can be binary integers of length equal to the number n of indexed distance data. The value of the $i^{th}$ bit of the marker of data b and of the minima marker c can indicate belonging of the indexed distance datum $d_i$ of index i respectively to the set of distance data to be processed and to the set of desired minimal distance data.

The use of such markers during the search for k minimal distance data stores if an indexed distance datum must continue to be treated or not and if it forms part of the k minimal distance data determined or not without having to reread any indexed distance datum. Each bit of each indexed distance datum is therefore always read a single time only during determination of the k minimal distance data.

Figure 2:
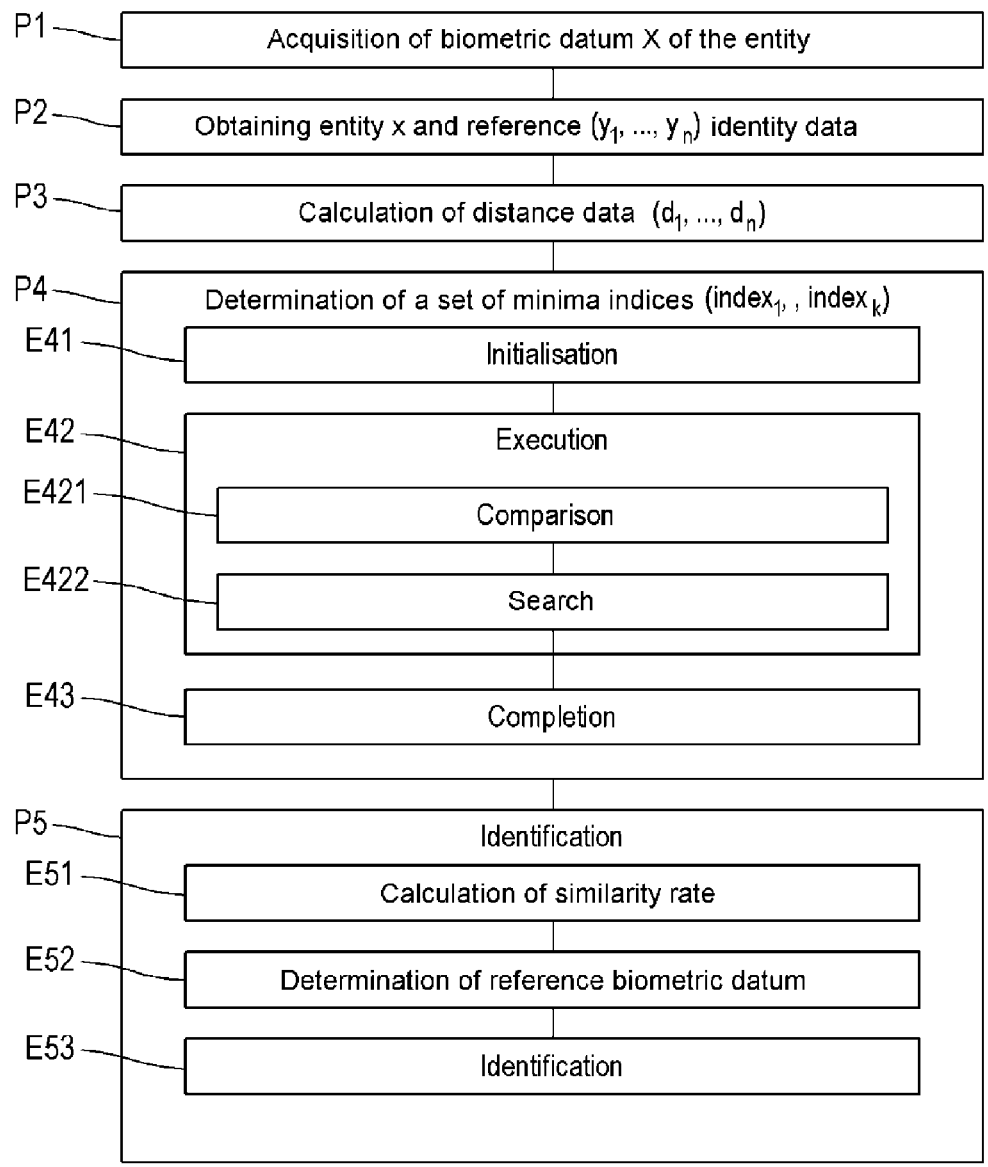
FIG. 2 is a diagram showing an embodiment of an identification method according to the invention.

The identification method can comprise, in reference to FIG. 2, an acquisition phase P1 during which the control server acquires a biometric datum X of the entity 1 to be identified. Such acquisition can be performed by the capture device 6. Such biometric datum can be a binary integer of length Q.

The identification method can then comprise an obtaining phase P2 during which an identity datum of the entity to be identified x is obtained from the acquired biometric datum of the entity to be identified X and reference identity data $(y_1, \ldots, y_n)$ are obtained from the indexed reference biometric data $(Y_1, \ldots, Y_n)$.

Said identity datum of the entity to be identified x and the reference identity data $(y_1, \ldots, y_n)$ can be binary integers of size q less than that Q of said biometric data.

The indices of reference identity data are associated with the indices of reference biometric data. A biometric datum and the derived identity datum can for example have the same index.

By way of example, in the event where the biometric data are iris images coded on 2048 bits, the control and management servers can reduce the sizes of the identity data to 128 bits. For this, the control and management servers can agree on an indexation set A of cardinal q which is a sub-set of the set $\{1, \ldots, Q\}$, such that the q bits of a biometric datum $Y_i$ indexed by the elements of $Y_i$. A are from the most significant bits of the biometric datum Y. In the case of the example above, Q is 2048 and q is 128.

The control and management servers generate identity data of reduced size x and $y_i$, i being between 1 and n, these data comprising respectively the bits of X and $Y_i$ indexes by A, such that the data x and $y_i$ are coded on q bits.

The identification method can then comprise a calculation phase P3 during which the control and management servers calculate the distance data $(d_1, \ldots, d_n)$, comprising for each reference identity datum $y_i$ the secure calculation of a distance, for example Hamming, between the identity datum of the entity to be identified x and said reference identity datum $y_i$. The security of such a calculation can also be ensured by using a secure multi party computation protocol.

The obtained distance data are simplified distance data of length q' less than the size of the reference biometric data. Such distance data do not enable determining the biometric datum corresponding to the entity to be identified but they can be employed to determine k biometric candidate data corresponding to minimal distance data. The lightness of these simplified distance data enables carrying out more rapidly this determination of the minimal distance data.

From the calculated indexed distance data $(d_1, \ldots, d_n)$, binary integers of length q', during a determination phase P4 the control and management servers perform determination of a set I of indices of minima (index1, . . . , indexk).

Said set I of indices of minima comprises at most a predetermined number k of indices of minimal distance data from said indexed distance data.

This determination phase P4 can comprise previously an initialisation step E41 during which:
  a list of data to be processed is determined, said list of data to be processed comprising said indexed distance data,
  a remaining number of indexed distance data to be set aside r is determined, said remaining number of indexed distance data to be set aside being equal to the difference between the number of indexed distance data n and the predetermined number of indices k.

With no distance datum having yet been processed at this time of the method, all the distance data $(d_1, \ldots, d_n)$ can still be minimal distance data or non-minimal distance. All these data are therefore for the instant added to the list of data to be processed.

When implementing the following step some of these distance data will be recognised as non-minimal distance data and set aside from the search process. To keep count of the number of distance data set aside, the remaining number of indexed distance data to be set aside r will be progressively updated. At this time of the method, since no datum has yet been processed, this number is initialised at the value n−k.

The determination phase P4 can then comprise an execution step E42 comprising, for each set of $j^{th}$ bits, so-called current bits, if indexed distance data contained in said list of data to be processed, so-called data to be processed, j being an integer varying from q'−1 to 0, a search of minimal distance data from these distance data to be processed as a function of the values of these current bits. Such a search is made starting with the set of most significant bits of the data to be processed and finishing with the set of least significant bits of the data to be processed.

The minimal distance data are searched for first of all in the list of data to be processed created during the initialisation step E41 and comprising all the indexed distance data by analysing the value of the most significant bit of the data to be processed.

As a function of the result of this first search, the list of data to be processed can be updated and the search can be repeated on the updated list of data to be processed this time by analysing the value of the bit following the most significant bit of the data to be processed.

More precisely, execution step E42 can comprise for each set of $j^{th}$ bits, so-called current bits, of indexed distance data contained in the list of data to be processed a comparison step E421 and a search step E422.

This comparison step E421 performs the comparison of a number of indices p of a first group of indices of indexed distance data with the remaining number of indexed data to be set aside r, said first group of indices comprising the indices of the indexed distance data from said list of data to be processed for which said current bit is equal to 1.

The analysis of the current bit of the data to be processed partitions them into two groups. One of these two groups comprises necessarily only minimal distance data or non-minimal distance data. The data of this group can therefore be categorised and set aside from the search process.

The search step E422 conducted following each comparison step E421 performs the following operations.

If the number of indices of the first group p is less than the remaining number of indexed data to be set aside r, the data whereof the indices belong to the first group are removed from said list of data to be processed. In such a case, the minimal distance data remaining to be found are in fact all contained in the second group. A new remaining number of indexed data to be set aside r can be determined by subtracting from the remaining number of indexed data to be set aside r the number of indices of the first group p.

If not, that is, if p is greater than or equal to r, the indexed distance data whereof the indices form part of the second group of indices of indexed distance data, that is, the indexed distance data from the list of data to be processed whereof the current bit is equal to 0, are removed from said list of data to be processed. In fact, all the non-minimal distance data remaining to be determined form part of the first group and the second group comprises only minimal distance data. The indices of the second group can be added to the set of indices of minima.

With each analysis of a set of current bits, all placed in the same position of, data of the current list of data to be processed, the data to be processed are partitioned into two groups and the data of one of the two groups are identified as minimal distance data or non-minimal and removed from the list of data to be processed. If non-minimal distance data have been identified and set aside, the remaining number r of indexed distance data to be set aside is updated.

Such determination of k minimal distance data particularly interesting for biometric data could also be used on distance data obtained from types of data other than biometric data, for example from media data such as image or video data in the scope of object recognition method, of image classification or motion tracking in a video.

On completion of the determination phase it is possible for the determined number of indices of minima to not be exactly equal to the predetermined number of indices of desired minimal distance data, for example if several indexed distance data are equal to the same value.

The method can comprise a completion step E43 during which, if the number of indices of the determined set of indices of minima is less than the predetermined number k of indices of minimal distance data, indices of indexed distance data belonging to the list of data to be processed are added to the set of indices of minima so that the set of indices of minimal distance data comprises exactly the predetermined number k of indices of minima.

Such a method can be performed by means of the marker of data to be processed b and of the minima marker c such as defined hereinabove. The belonging of the indexed distance data to said list of data to be processed is stored in the form of the marker of data to be processed b, said marker of data to be processed being a binary integer of length equal to the number n of indexed distance data and the value of the $i^{th}$ bit of said marker indicating belonging or not of the $i^{th}$ distance datum indexed to said list of data to be processed.

Similarly, belonging of indices of indexed distance data to the set of indices of minima I is stored in the form of the minima marker c, said minima marker being a binary integer of length equal to the number n of indexed distance data, the value of the $i^{th}$ bit of said marker indicating belonging or not of the index i to the set of indices of minima I.

Then, the initialisation step E41 further comprises initialisation of all the bits of the marker of data to be processed b and of the minima marker c at the value 1. Such initialisation indicates that no datum for the instant has been processed or recognised as minimal distance datum.

The comparison step E421 comprises, when conducted for a set of $j^{th}$ current bits of data of the list of data to be processed, steps of:
  determining the number p of indices of the first group by counting the number of elements equal to the value 1 from the set $(d_1^j$ AND $b_1, \ldots, d_n^j$ AND $b_n)$, the notation $d_i^j$ representing the value of the $j^{th}$ bit of the indexed index distance datum i,
  if the number p of indices of the first group is less than the remaining number of indexed data to be set aside r, fixing of a comparison bit e at the value 1,
  else, fixing of said comparison bit e at the value 0.

The value of the comparison bit e stores the result of the comparison of the number p of indices of the first group and of the remaining number of indexed data to be set aside r, to allow transformation of this method into a Boolean circuit able to be securely evaluated.

Finally, the search step E422 is conducted by carrying out:
  updating of the remaining number of indexed data to be set aside r, the remaining number of indexed data to be set aside r being replaced by the value [((r−p) XOR r) AND e]XOR r,
  updating of each bit of the minima marker c, each $i^{th}$ bit $c_i$ of the minima marker c being replaced by the value $[(d_i^j$ OR e) OR (b XOR 1)] AND $c_i$,
  updating of each bit of the marker of data to be processed b, each $i^{th}$ bit $b_i$ of the marker of data to be processed b being replaced by the value (e XOR $d_i^j$) AND $b_i$.

The use of the comparison bit e, markers of data to be processed b and of minima c, and logic formulas hereinabove has no need to distinguish several logic formulas as a function of the result of the comparison between the number p of indices of the first group and of the remaining number of indexed data to be set aside r. This translates the operations to be conducted to execute this method in the form of a Boolean circuit to be evaluated securely by means of a secure multi party computation protocol, and minimises the size of the generated Boolean circuit.

So that the set of indices of minimal distance data comprise exactly the predetermined number k of indices of minima, the completion step can successively comprise for each index i of the indexed distance data:
  if the remaining number of indexed data to be set aside r is greater than zero, the determination of a new value of the remaining number of indexed data to be set aside by subtracting the $i^{th}$ bit $b_i$ of the marker of data to be processed b of the remaining number of indexed data to be set aside, and resetting to zero of the value of the $i^{th}$ bit b of the marker of data to be processed b,
  updating of the $i^{th}$ bit $c_i$ of the minima marker c by the value $c_i = c_i$ AND $(b_i$ XOR 1).

The r first distance data remaining to be processed are considered as non-minimal distance data and set aside by setting the corresponding bits of the marker of data to be processed b to zero, then the following distance data remaining to be processed are considered as minimal distance data and the corresponding bits of the minima marker c are reset to zero.

On completion of this determination phase, k indices of minima have been determined. These indices correspond to the k reference identity data closest to the identity datum of the entity to be identified. These k identity data are considered to be the best candidates for trying to identify the entity.

An example of conducting the determination phase P4 is given in annex.

It is supposed in this example that the aim is determining k=4 minimal distance data from the following n=6 values (y1, . . . , y6)=(56, 12, 44, 41, 26, 44).

During the initialisation step, all the bits of the markers b and c are fixed at 1. The initial value of the remaining number of indexed distance data to be set aside r=n−k=6−4=2 is also calculated. The list of the data to be processed comprises all the distance data.

The execution step is then conducted.

A first comparison step and a first search step are performed for the most significant bits of the distance data.

The number of elements of the first group of distance data, whereof the most significant bit is equal to 1, reaches 4 and is therefore greater than or equal to the remaining number of indexed distance data r=2.

As a consequence, the data of second group (12 and 26) are minimal distance data and can be set aside from the search for later steps. The corresponding bits of the markers b and c are reset to zero.

A new comparison step and a new search step are performed for the following bits, the $5^{th}$ bits, of the data remaining to be processed (56, 44, 41, 44).

A single datum (56) presents a current bit equal to 1. As a consequence, this datum is not a minimal distance datum and can be set aside. The corresponding bit of the marker b is reset to zero and the remaining number of indexed distance data is updated to the value 1.

A new comparison step and a new search step are conducted for the following bits, the $4^{th}$ bits, of the data remaining to be processed (44, 41, 44).

All these bits being equal to 1, the last non-minimal distance datum to be identified forms part of these distance data and no supplementary minimal distance datum is identified at this step.

A new comparison step and a new search step are performed for the following bits, the $3^{th}$ bits, of the data remaining to be processed (44, 41, 44).

The number of elements of the first group of distance data, whereof the current bit is equal to 1, reaches 2 and is therefore greater than or equal to the remaining number of indexed distance data r=1.

As a consequence, the datum of the second group (41) is a minimal distance datum and can be set aside from the search for later steps. The corresponding bits of the markers b and c are reset to zero.

There is still a minimal distance datum and a non-minimal distance datum from the two distance data remaining to be processed (44, 44).

These data being equal, implementation of new comparison and search steps for the $2^{th}$ bit of these data then for the least significant bit of these data does not identify the final minimal distance datum to be identified.

The completion step is conducted to designate the first of the two data, in their order of indexation, such as non-minimal distance data and the second of these distance data such as minimal distance datum. The corresponding bit of the minima marker is reset to zero and the four minimal distance data identified are the second, fourth, fifth and sixth minimal distance data, that is, the values 12, 41, 26 and 44.

The control and management server then executes an identification phase P5 of the entity to be identified from the reference entities corresponding to the stored reference biometric data associated with the indices of minimal distance data ($index_1, \ldots, index_k$) determined during the determination phase.

Such identification phase can comprise determination of at least one reference biometric datum, from the stored reference biometric data associated with the indices of minimal distance data ($index_1, \ldots, index_k$) determined during the determination phase, similar to the acquired biometric datum of the entity to be identified.

With the number of comparisons to be made between the datum of the entity and the reference data being reduced to k, this time these comparisons can be made on the complete biometric data to carry out identification with the highest precision possible.

Alternatively, the entity to be identified can be identified without reusing the acquired biometric datum and the reference biometric data. For example, a second datum relative to the entity to be identified can be acquired, such as a photograph or a password, and compared to data of same type, which can for example be recorded in the storage device 5 for the reference entities. By way of executing the determination phase this second datum can be compared only to data of the same types recorded for the reference entities associated with the indices of minimal distance data ($index_1, \ldots, index_k$) determined during the determination phase. The acquired biometric datum can be used to perform initial sorting from the reference entities recorded on the management server, then a second datum of different type can be employed for final identification of the entity to be identified.

Such identification phase can comprise a calculation step E51 during which a calculation is made for each reference biometric datum $Y_i$ whereof the index is associated with an index of the determined set of minima I, of a degree of similarity between the acquired biometric datum of the entity to be identified X and said reference biometric datum $Y_i$.

The identification phase can then comprise a determination step E52 of at least one reference biometric datum whereof the degree of similarity exceeds a predetermined threshold, and an identification step E53 of the entity to be identified from the determined reference biometric data.

The calculation of a degree of similarity between the acquired biometric datum of the entity to be identified X and a reference biometric datum $Y_i$ can comprise calculation of a distance, for example Hamming, between the acquired biometric datum of the entity to be identified and said reference biometric datum. The at least one reference biometric datum determined during the determination step E52 is then said at least one reference biometric datum for which the distance calculated is less than a predetermined threshold.

If no degree of calculated similarity reaches the required predetermined threshold, no reference biometric datum is sufficiently close to the acquired biometric datum to positively identify the entity to be identified and its identification can be refused.

Such identification could be performed from minimal distance data corresponding to distances between other types of data, for example image data such as portraits of individuals.

As mentioned earlier, at least one part of the method is conducted securely such that the management and control servers obtain respectively no information on the acquired biometric datum of the entity or on the reference biometric data stored in the storage device.

For this, operations on binary integers for implementing at least said execution step of the method can be translated in the form of at least one Boolean circuit and this Boolean circuit can then be used to execute at least said execution step of the method securely between the control server and the management server by means of a secure multi party computation protocol (SMC) such as the Yao protocol (Andrew Chi-Chih Yao, "How to generate and exchange secrets", Foundations of Computer Science, 1986., 27th Annual Symposium, pages 162-167. IEEE, 1986) or the GMW protocol (O. Goldreich, S. Micali, and A. Wigderson, "How to play any mental game or a completeness theorem for protocols with honest majority", Symposium on Theory of Computing (STOC), pages 218-229. ACM, 1987).

The execution step of the method is not the only one which can be conducted securely by means of such a protocol. Such a protocol can also be applied to the other phases and steps of the method, especially to the calculation phase of the distance data. This shares the indexed distance data between the control server and the management server such that none of said distance data is known to the management server or the control server.

To translate the steps of the method in the form of a Boolean circuit, each operation performed on the indexed distance data, the markers of data to be processed b and of minima c or on the comparison bit e must be translated in the form of a logic circuit.

The paragraphs hereinbelow give by way of non-limiting example an example of a secure embodiment by means of the Yao protocol of the method according to the invention from the identity datum of the entity to be identified x and the reference identity data ($y_1, \ldots, y_n$) obtained on completion of the obtaining phase P2. The operations on binary integers corresponding to the calculation phase P3, to the determination phase P4 and to the identification phase P5 must be translated in the form of a logic circuit f to be evaluated securely by the Yao protocol. Alternatively, such a protocol could be employed for conducting a more restricted set of phases and steps of the method. For example such a protocol could be applied only for implementing calculation P3 and determination P4 phases from the identity datum of the entity to be identified x and the reference identity data ($y_1, \ldots, y_n$) obtained on completion of the obtaining phase P2. According to another example such a method could be applied only for implementing the determination phase P4 and the identification phase P5, from the distance data ($d_1, \ldots, d_n$) calculated during the calculation phase P3.

The Yao protocol can therefore be conducted between the management server and the control server to securely evaluate the Boolean circuit f corresponding to implementing the calculation P3, determination P4 and identification P5 phases of the method.

To achieve this, one of the two servers, for example the management server, creates a garbled circuit corresponding to the circuit f to be evaluated as well as pairs of encryption keys (one for the binary value 0 and one for the binary value 1) for each of the entry bits of the circuit f, that is, for each bit of the reference identity data and of the identity datum of the entity to be identified x. The management server also generates a pair of encryption keys for each output of each non-XOR gate of the circuit f. The creator of the garbled circuit finally generates a concordance table T between the encryption keys of the result of the circuit f and the result itself.

Once the circuit is created, the management server send the control server the concordance table T, the secure table of each non-XOR gate of the circuit and its own secure entries of the circuit: if for example, a reference identity datum has the value b on an entrance wire $W_i$ of the circuit then the management server sends $W_i^b$.

Accordingly, for each entry bit y of a reference identity datum equal to 0 (respectively 1) at input of the circuit, the creator sends only the encryption key $K_0^y$ (respectively $k_1^y$). Since these keys are random, the control server using the garbled circuit obtains no information on the corresponding bits of the reference identity data and therefore on the reference biometric data retained by the management server.

Also, the control server recovers from the management server, by eblivious transfer, the keys corresponding to the bits of input data of the circuit f which it has, that is, corresponding to the bits of the identity datum x of the entity to be identified.

So, for each bit xi of the identity datum x of the entity to be identified the management server prepares a list with two elements composed of $k\text{-hd } 0^{xi}$ and $k_1^{xi}$ and the index selected by the user for eblivious transfer is the value of the bit xi.

Using the method of eblivious transfer disallows the management server to obtain any information on the values of the bits of the identity datum x of the entity to be identified.

Finally, the control server can evaluate the garbled circuit by means of the keys it has obtained, and translate the result it obtains at output by means of the concordance table.

Such a method identifies an entity by means of a secure protocol based on Boolean circuits for a lesser calculation cost, by minimising the number of non-XOR gates and the depth of the Boolean circuit employed to determine several minimal distances between a biometric datum of the individual acquired and reference biometric data.

| ANNEX |
| --- |
| Initialisation  b = 111111, c = 111111 and r = 6 − 4 = 2 |
| Study of 6th bit (j=5) |
|     56=111000  12=001100  44=101100  41=101001  26=011010  44=101100 |
|     p = 1 + 0 + 1 + 1 + 0 + 1 = 4 ≥ r |
|     Therefore d = 0 (r remains at 2) |
|     Therefore b = 101101 and e = 101101 |
| Study of 5th bit (j=4) |
|     56=111000  12=001100  44=101100  41=101001  26=011010  44=101100 |
|     p = 1 + 0 + 0 + 0 = 1 < r |
|     Therefore d = 1 and r = 2 − 1 = 1 |
|     Therefore b = 001101 and e = 101101 |
| Study of 4th bit (j=3) |
|     56=111000  12=001100  44=101100  41=101001  26=011010  44=101100 |
|     p = 1 + 1 + 1 = 3 ≥ r |
|     Therefore d = 0 (r remains at 1) |
|     Therefore b = 001101 and c = 101101 |
| Study of 3rd bit (j=2) |
|     56=111000  12=001100  44=101100  41=101001  26=011010  44=101100 |
|     p = 1 + 0 + 1 = 2 ≥ r |
|     Therefore d = 0 (r remains at 1) |
|     Therefore b = 001001 and c = 101001 |
| Study of 2nd bit (j=1) |
|     56=111000  12=001100  44=101100  41=101001  26=011010  44=101100 |
|     p = 0 + 0 = 0 < r |
|     Therefore d =1 and r = 1 − 0 = 1 |
|     Therefore b = 001001 and c = 101001 |
| Study of 1st bit (j=0) |
|     56=111000  12=001100  44=101100  41=101001  26=011010  44=101100 |
|     p = 0 + 0 = 0 < r |
|     Therefore d = 1 and r = 1 − 0 = 1 |
|     Therefore b = 001001 and c = 101001 |
| Finalisation to obtain exactly 4 minima c = 101000 |
| The $2^{nd}, 4^{th}\ 5^{th}$ and $6^{th}$ integers are the 4 minima of the list |

The invention claimed is:

1. An identification method of an entity,
executed by an identification system comprising a management server connected to a storage device storing indexed reference biometric data ($Y_1, \ldots, Y_n$) corresponding to reference entities and a control server acquiring a biometric datum of the entity to be identified (X),
from indexed distance data ($d_1, \ldots, d_n$), said indexed distance data being distances calculated from the stored indexed reference biometric data and the acquired biometric datum of the entity to be identified, said indexed distance data being shared between said control server and said management server such that none of said distance data is known to the management server or the control server, said indexed distance data being binary integers of length q', said identification method comprising:
  a determination phase of a set of indices of minima ($index_1, \ldots, index_k$),
  said set of indices of minima comprising at most a predetermined number of indices of minimal distance data from said indexed distance data,
  said determination phase comprising:
    an initialisation step comprising:
      determining a list of data to be processed, said list of data to be processed comprising said indexed distance data,
      determining a remaining number of indexed distance data to be set aside I, said remaining number of indexed distance data to be set aside being equal to the difference between the number of indexed distance data (n) and the predetermined number of indices (k),
    an execution step comprising,
    for each set of $j^{th}$ bits of indexed distance data comprised in said list of data to be processed, j being an integer varying from q'-1 to 0, performing the following steps,
    starting by the set of most significant bits of the data to be processed and finishing by the set of least significant bits of the data to be processed:
      comparing a number of indices of a first group of indices of indexed distance data (p) to the remaining number of indexed data to be set aside I,
      said first group of indices comprising the indices of the indexed distance data from said list of data to be processed for which said current bit is equal to 1,
      searching indices of minima comprising:
        if the number of indices of the first group (p) is less than the remaining number of indexed data to be set aside I:
          removing from said list of data to be processed, data whereinthe indices belong to the first group and,
          determining a new remaining number of indexed data to be set aside I by subtracting from the remaining number of indexed data to be set aside I the number of indices of the first group (p);
        else:
          removing from said list of data to be processed, indexed distance data wherein the indices form part of a second group of indices of indexed distance data,
          said second group comprising the indices of the indexed distance data from said list of data to be processed for which said current bit is equal to 0, and
          adding said indices of the second group to the set of indices of minima;
  an identification phase of the entity to be identified from the reference entities corresponding to the stored reference biometric data associated with the indices of minimal distance data ($index_1, \ldots index_k$) determined during the determination phase, the operations on binary integers for implementing at least said execution step of said identification method, being translated in the form of at least one Boolean circuit, said Boolean circuit being then used to execute at least said execution step, said execution step being carried out securely between the control server and the management server by a secure multi party computation protocol for secure evaluation of said Boolean circuit, said identification method further comprising:
  belonging of the indexed distance data to said list of data to be processed is stored in the form of a marker of data to be processed, said marker of data to be processed being a binary integer (b) of length equal to the number of indexed distance data (n) and the value of the $i_{th}$ bit of said marker indicating belonging or not belonging of the $i_{th}$ indexed distance datum to said list of data to be processed,
  belonging of indices of indexed distance data to the set of indices of minima is stored in the form of a minima marker, said minima marker being a binary integer I of length equal to the number of indexed distance data (n), the value of the $i^{th}$ bit of said marker indicating belonging or not belonging of the index I to the set of indices of minima,
  the number of indexed distance data $d_i, \ldots, d_n$ being equal to n:
    the initialisation step further comprises initialisation of all the bits of the marker of data to be processed b and of the minima marker c at the value 1,
    the comparison step comprising:
      determining the number (p) of indices of the first group by counting the number of elements equal to the value 1 from the set ($d_1^j$ AND $b_1, \ldots, d_n^j$ AND $b_n$), the notation $d_i^j$ representing the value of the $j^{th}$ bit of the indexed index distance datum I,
      if the number (p) of indices of the first group is less than the remaining number of indexed data to be set aside I, setting of a comparison bit e at the value 1,
      else, setting of said comparison bit e at the value 0,
    the search step is conducted by:
      updating of the remaining number of indexed data to be set aside r, the remaining number of indexed data to be set aside r being replaced by the value [((r−p) XOR r) AND e] XOR r,
      updating of each bit of the minima marker c, each $i^{th}$ bit $c_i$ of the minima marker c being replaced by the value [($d_I^j$ OR e) OR ($b_I$ XOR 1)] AND $c_I$,
      updating of each bit of the marker of data to be processed b, each $i^{th}$ bit $b_i$ of the marker of data to be processed b being replaced by the value (e XOR $d_i^j$) AND $b_i$.

2. The identification method according to claim 1 wherein the identification phase comprises determination of at least one reference biometric datum similar to the acquired biometric datum of the entity to be identified, from the stored reference biometric data associated with the indices of minimal distance data ($index_1, \ldots index_k$) determined during the determination phase.

3. The identification method according to claim 2, wherein the identification phase further comprises steps of:
  calculating, for each reference biometric datum ($Y_i$) wherein the index is associated with an index of the determined set of minima (I), of a degree of similarity between the acquired biometric datum of the entity to be identified (X) and said reference biometric datum ($Y_i$);

determining at least one reference biometric datum wherein the degree of similarity exceeds a predetermined threshold;

identifying the entity to be identified from the determined reference biometric data.

4. The identification method according to claim 3 wherein:

calculating said degree of similarity between the acquired biometric datum of the entity to be identified (X) and said reference biometric datum ($Y_i$) comprises the calculation of a distance between the acquired biometric datum of the entity to be identified and said reference biometric datum;

said at least one determined reference biometric datum is at least one reference biometric datum for which the distance calculated is less than a predetermined threshold.

5. The identification method according to claim 1 comprising, on completion of the determination phase, if the number of indices of the set of indices of minima determined is less than the predetermined number (k) of indices of minimal distance data, performing a completion step during which indices of indexed distance data belonging to the list of data to be processed are added to the set of indices of minima, such that said set comprises a number of indices equal to the predetermined number (k) of indices of minimal distance data.

6. The identification method according to claim 5 wherein said completion step successively comprises for each index I of the indexed distance data:

if the remaining number of indexed data to be set aside I is greater than zero, the determination of a new value of the remaining number of indexed data to be set aside by subtracting the $i^{th}$ bit $b_I$ of the marker of data to be processed b from the remaining number of indexed data to be set aside, and resetting to zero of the value of the $i^{th}$ bit $b_I$ of the marker of data to be processed b, updating of the $i^{th}$ bit $c_I$ of the minima marker c by the value $c_I = c_I$ AND($b_I$ XOR 1).

7. The identification method according to claim 1, wherein said reference biometric data are binary integers, and comprising:

an acquisition phase by the control server of the biometric datum (X) of the entity to be identified, an obtaining phase of an identity datum of the entity to be identified (x) and reference identity data ($y_1, \ldots, y_n$), from respectively the acquired biometric datum (X) and the indexed reference biometric data ($Y_1, \ldots, Y_n$), such that said identity datum of the entity to be identified (x) and the reference identity data ($y_1, \ldots, y_n$) are binary integers of lesser size than that of said biometric data, the indices of the reference identity data being associated with the indices of the reference biometric data, a calculation phase (P3) of the distance data ($d_1, \ldots, d_n$) comprising for each reference identity datum ($y_i$) the secure calculation of a distance between the identity datum of the entity to be identified (x) and said reference identity datum ($y_i$).

8. The identification method according to claim 1, wherein the secure multi party computation protocol is the Yao protocol or the GMW protocol.

9. A computer program product comprising a non-transitory computer readable storage medium having computer readable program code instructions embodied therewith that when executed by a processor of a computer causes the computer to perform an identification method of an entity comprising:

a determination phase of a set of indices of minima ($index_1, \ldots, index_k$), said set of indices of minima comprising at most a predetermined number of indices of minimal distance data from said indexed distance data, said determination phase comprising:

an initialisation step comprising:

determining a list of data to be processed, said list of data to be processed comprising said indexed distance data, determining a remaining number of indexed distance data to be set aside I, said remaining number of indexed distance data to be set aside being equal to the difference between the number of indexed distance data (n) and the predetermined number of indices (k), an execution step comprising, for each set of $j^{th}$ bits of indexed distance data comprised in said list of data to be processed, j being an integer varying from q'−1 to 0, performing the following steps, starting by the set of most significant bits of the data to be processed and finishing by the set of least significant bits of the data to be processed:

comparing a number of indices of a first group of indices of indexed distance data (p) to the remaining number of indexed data to be set aside I, said first group of indices comprising the indices of the indexed distance data from said list of data to be processed for which said current bit is equal to 1, searching indices of minima comprising:

if the number of indices of the first group (p) is less than the remaining number of indexed data to be set aside I:

removing from said list of data to be processed, data wherein the indices belong to the first group and, determining a new remaining number of indexed data to be set aside I by subtracting from the remaining number of indexed data to be set aside I the number of indices of the first group (p);

else:

removing from said list of data to be processed, indexed distance data wherein the indices form part of a second group of indices of indexed distance data, said second group comprising the indices of the indexed distance data from said list of data to be processed for which said current bit is equal to 0, and adding said indices of the second group to the set of indices of minima;

an identification phase of the entity to be identified from the reference entities corresponding to the stored reference biometric data associated with the indices of minimal distance data ($index_1, \ldots index_k$) determined during the determination phase, the operations on binary integers for implementing at least said execution step of said identification method, being translated in the form of at least one Boolean circuit, said Boolean circuit being then used to execute at least said execution step, said execution step being carried out securely between the control server and the management server by a secure multi party computation protocol for secure evaluation of said Boolean circuit, said identification method further comprising:

belonging of the indexed distance data to said list of data to be processed is stored in the form of a marker of data to be processed, said marker of data to be processed being a binary integer (b) of length equal to the number of indexed distance data (n) and the value of the $i^{th}$ bit of said marker indicating belonging or not belonging of the $i^{th}$ indexed distance datum to said list of data to be processed, belonging of indices of indexed distance data to the set of indices of minima is stored in the form of a minima marker, said minima marker being a binary integer I of length equal to the number of indexed distance data (n), the value of the $i^{th}$ bit of said marker indicating belonging or not belonging of the index I to the set of indices of minima, the number of indexed distance data $d_1, \ldots, d_n$ being equal to n:

the initialisation step further comprises initialisation of all the bits of the marker of data to be processed b and of the minima marker c at the value 1, the comparison step comprising:

determining the number (p) of indices of the first group by counting the number of elements equal to the value 1 from the set ($d_1^j$ AND $b_1, \ldots, d_n^j$ AND $b_n$), the notation $d_i^j$ representing the value of the $j^{th}$ bit of the indexed index distance datum I, if the number (p) of indices of the first group is less than the remaining number of indexed data to be set aside I, setting of a comparison bit e at the value 1, else, setting of said comparison bit e at the value 0, the search step is conducted by:

updating of the remaining number of indexed data to be set aside r, the remaining number of indexed data to be set aside r being replaced by the value [((r−p) XOR r) AND e] XOR r, updating of each bit of the minima marker c, each $i^{th}$ bit $c_i$ of the minima marker c being replaced by the value [($d_i^j$ OR e) OR ($b_I$ XOR 1)] AND $c_I$, updating of each bit of the marker of data to be processed b, each $i_{th}$ bit $b_i$ of the marker of data to be processed b being replaced by the value (e XOR $d_i^j$) AND $b_i$.

10. An identification system of an entity comprising a management server connected to a storage device storing indexed reference biometric data ($Y_1, \ldots, Y_n$) corresponding to reference entities and a control server acquiring a biometric datum of the entity to be identified (X), said management server and said control server sharing indexed distance data ($d_1, \ldots, d_n$), such that none of said distance data is known to the management server or the control server, said indexed distance data being distances calculated from the stored indexed reference biometric data and the acquired biometric datum of the entity to be identified, wherein:

said control server and said management server comprise a processor configured to execute the phases and steps of an identification method comprising:

a determination phase of a set of indices of minima ($index_1, \ldots, index_k$), said set of indices of minima comprising at most a predetermined number of indices of minimal distance data from said indexed distance data, said determination phase comprising:

an initialisation step comprising:

determining a list of data to be processed, said list of data to be processed comprising said indexed distance data, determining a remaining number of indexed distance data to be set aside I, said remaining number of indexed distance data to be set aside being equal to the difference between the number of indexed distance data (n) and the predetermined number of indices (k), an execution step comprising, for each set of $j^{th}$ bits of indexed distance data comprised in said list of data to be processed, j being an integer varying from q'−1 to 0, performing the following steps, starting by the set of most significant bits of the data to be processed and finishing by the set of least significant bits of the data to be processed:

comparing a number of indices of a first group of indices of indexed distance data (p) to the remaining number of indexed data to be set aside I, said first group of indices comprising the indices of the indexed distance data from said list of data to be processed for which said current bit is equal to 1, searching indices of minima comprising:

if the number of indices of the first group (p) is less than the remaining number of indexed data to be set aside I:

removing from said list of data to be processed, data wherein the indices belong to the first group and, determining a new remaining number of indexed data to be set aside I by subtracting from the remaining number of indexed data to be set aside I the number of indices of the first group (p);

else:

removing from said list of data to be processed, indexed distance data wherein the indices form part of a second group of indices of indexed distance data, said second group comprising the indices of the indexed distance data from said list of data to be processed for which said current bit is equal to 0, and adding said indices of the second group to the set of indices of minima;

an identification phase of the entity to be identified from the reference entities corresponding to the stored reference biometric data associated with the indices of minimal distance data ($index_1, \ldots index_k$) determined during the determination phase, the operations on binary integers for implementing at least said execution step of said identification method, being translated in the form of at least one Boolean circuit, said Boolean circuit being then used to execute at least said execution step, said execution step being carried out securely between the control server and the management server by a secure multi party computation protocol for secure evaluation of said Boolean circuit, said identification method further comprising:

belonging of the indexed distance data to said list of data to be processed is stored in the form of a marker of data to be processed, said marker of data to be processed being a binary integer (b) of length equal to the number of indexed distance data (n) and the value of the $i_{th}$ bit of said marker indicating belonging or not belonging of the $i^{th}$ indexed distance datum to said list of data to be processed, belonging of indices of indexed distance data to the set of indices of minima is stored in the form of a minima marker, said minima marker being a binary integer I of length equal to the number of indexed distance data (n), the value of the $i_{th}$ bit of said marker indicating belonging or not belonging of the index I to the set of indices of minima, the number of indexed distance data $d_1, \ldots, d_n$ being equal to n:

the initialisation step further comprises initialisation of all the bits of the marker of data to be processed b and of the minima marker c at the value 1, the comparison step comprising:

determining the number (p) of indices of the first group by counting the number of elements equal to the value 1 from the set $(d_1^j \text{ AND } b_1, \ldots, d_n^j \text{ AND } b_n)$, the notation $d_i^j$ representing the value of the $j^{th}$ bit of the indexed index distance datum I, if the number (p) of indices of the first group is less than the remaining number of indexed data to be set aside I, setting of a comparison bit e at the value 1, else, setting of said comparison bit e at the value 0, the search step is conducted by:

updating of the remaining number of indexed data to be set aside r, the remaining number of indexed data to be set aside r being replaced by the value $[((r-p) \text{ XOR } r) \text{ AND } e] \text{ XOR } r$, updating of each bit of the minima marker c, each $i^{th}$ bit $c_i$ of the minima marker c being replaced by the value $[(d_1^j \text{ OR } e) \text{ OR } (b_I \text{ XOR } 1)] \text{ AND } c_I$, updating of each bit of the marker of data to be processed b, each $i^{th}$ bit $b_i$ of the marker of data to be processed b being replaced by the value $(e \text{ XOR } d_1^j) \text{ AND } b_i$.

* * * * *